(12) United States Patent
De Armas et al.

(10) Patent No.: US 8,893,218 B2
(45) Date of Patent: Nov. 18, 2014

(54) ASSOCIATION OF SERVICE POLICIES BASED ON THE APPLICATION OF MESSAGE CONTENT FILTERS

(75) Inventors: Mario E. De Armas, Wellington, FL (US); Steven Groeger, Poole (GB); Heather M. Kreger, Louisburg, NC (US); Robert G. Laird, Colorado Springs, CO (US); Arnaud J. Le Hors, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/524,065

(22) Filed: Jun. 15, 2012

(65) Prior Publication Data
US 2013/0340026 A1    Dec. 19, 2013

(51) Int. Cl.
*G06F 17/00*   (2006.01)
*H04L 29/06*   (2006.01)

(52) U.S. Cl.
USPC ............................................................ 726/1

(58) Field of Classification Search
USPC ............................................................. 726/1
See application file for complete search history.

(56) References Cited

U.S. PATENT DOCUMENTS

| | | | |
|---|---|---|---|
| 7,310,684 B2 | 12/2007 | Patrick et al. | |
| 2004/0240447 A1* | 12/2004 | Dorbolo et al. | 370/392 |
| 2005/0198351 A1 | 9/2005 | Nog et al. | |
| 2006/0206931 A1 | 9/2006 | Dillaway et al. | |
| 2008/0046335 A1 | 2/2008 | Zhou | |
| 2011/0047451 A1 | 2/2011 | Jardine-Skinner et al. | |
| 2011/0209194 A1* | 8/2011 | Kennedy | 726/1 |
| 2011/0225281 A1* | 9/2011 | Riley et al. | 709/223 |

OTHER PUBLICATIONS

Office Action of co-pending U.S. Appl. No. 13/912,552 mailed Mar. 20, 2014, all enclosed pages cited.

* cited by examiner

*Primary Examiner* — Kambiz Zand
*Assistant Examiner* — Stephen Sanders
(74) *Attorney, Agent, or Firm* — Nelson Mullins Riley & Scarborough, LLP

(57) ABSTRACT

A method for associating service policies based on application of message content filters to messages sent by a consumer may include receiving a message in which the message relates to a service accessible via a network and access to the service is restricted by a policy enforcement runtime. The method may further include applying at least one message content filter to the message content received to extract information indicative of a message flow associated with a configured policy attachment and correlating the message flow to a selected policy regarding consumer access to the service. The method may further include enforcing the selected policy relative to access to the service by the consumer.

14 Claims, 5 Drawing Sheets

ASSOCIATION OF SERVICE POLICIES BASED ON THE APPLICATION OF MESSAGE CONTENT FILTERS

BACKGROUND

Example embodiments generally relate to service provision technology and, more particularly, relate to a mechanism by which policy transformation may be employed to an object or message flow to be controlled by a policy to be associated with the policy based on content associated with the object.

SUMMARY

Some example embodiments may provide an ability to provide different access policies to different consumers based on message content filtering. Accordingly, web service provision may be improved.

In this regard, for example, one example embodiment may include a method for associating service policies based on message content filter application is provided. The method may include receiving a message or messages sent by a consumer where the messages relate to a service accessible via a network and access to the service is restricted by a policy enforcement runtime. The method may further include applying at least one message content filter to the message received to extract information indicative of message flow associated with a configured policy attachment. The method may further include correlating (e.g., via processing circuitry) the message flow to a selected policy regarding consumer access to the service, and applying the selected policy relative to access to the service by the consumer.

In another example embodiment, an apparatus for associating service policies based on message content filter application is provided. The apparatus may include processing circuitry configured for receiving message content sent by a consumer where the message content relates to a service accessible via a network and access to the service is restricted by a policy enforcement runtime and applying at least one message content filter to the message content received to extract information indicative of message flow associated with a configured policy attachment. The processing circuitry may be further configured for correlating the object to a selected policy regarding consumer access to the service, and enforcing the selected policy relative to access to the service by the consumer.

In another example embodiment, a computer program product for associating service policies based on the application of a message content filter is provided. The computer program product may include a computer-readable storage medium having computer-executable program code instructions stored therein. The computer-executable program code instructions may include program code instructions for receiving message content sent by a consumer where the message content relates to a service accessible via a network and access to the service is restricted by a policy enforcement runtime and applying at least one message content filter to the message content received to extract information indicative of a message flow associated with a configured policy attachment. The computer-executable program code may further include program code instruction for correlating (e.g., via processing circuitry) the message flow to a selected policy regarding consumer access to the service, and applying the selected policy relative to access to the service by the consumer.

BRIEF DESCRIPTION OF THE SEVERAL VIEWS OF THE DRAWINGS

Figure 1:
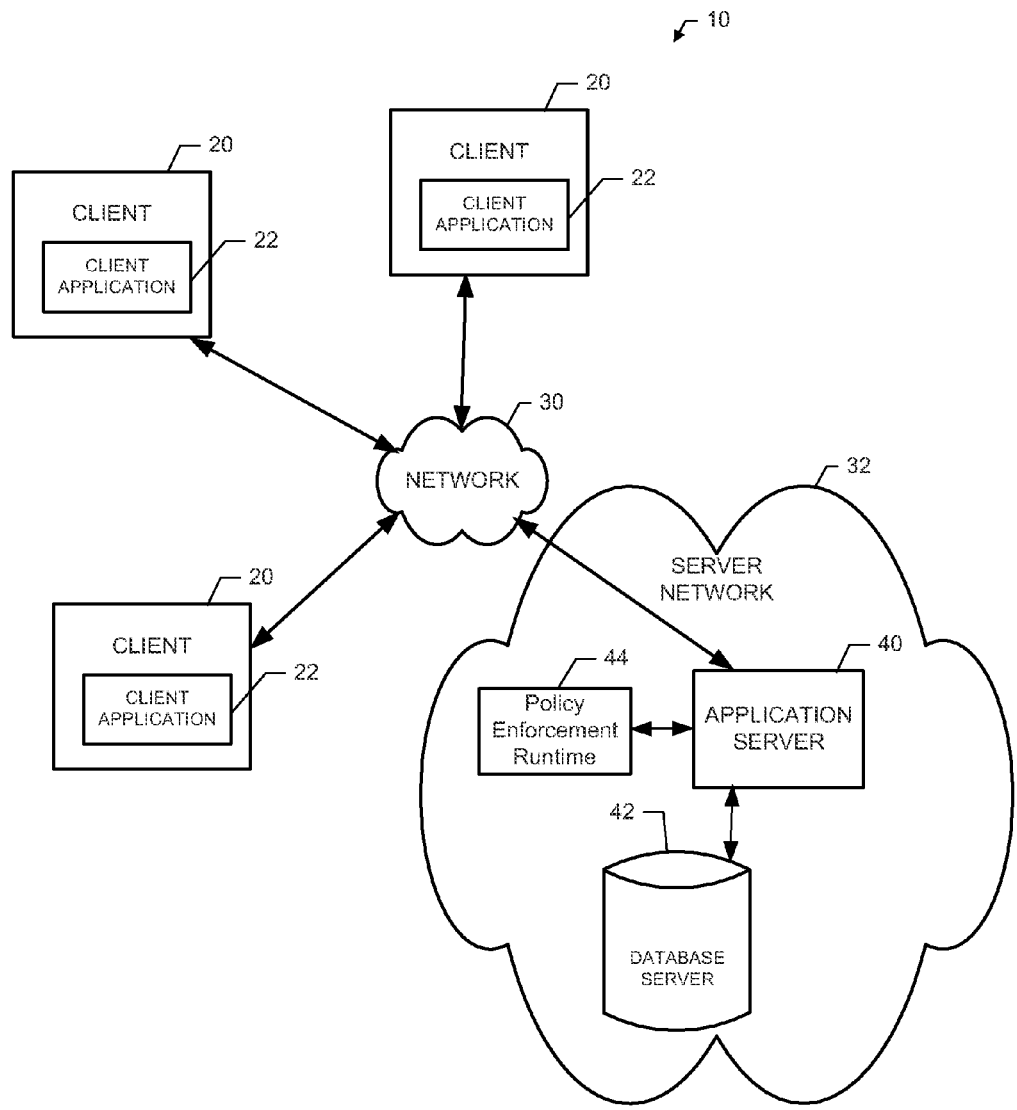
Figure 2:
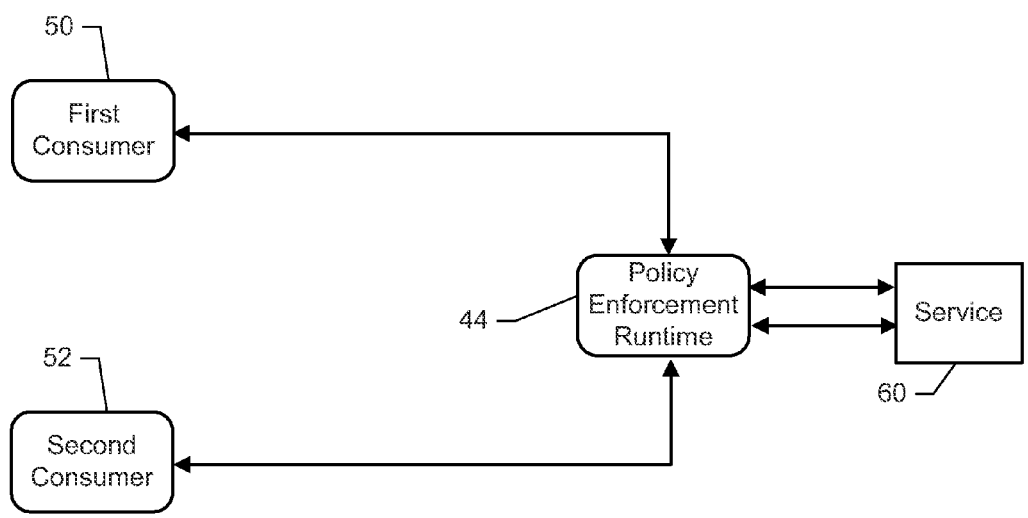
Figure 3:
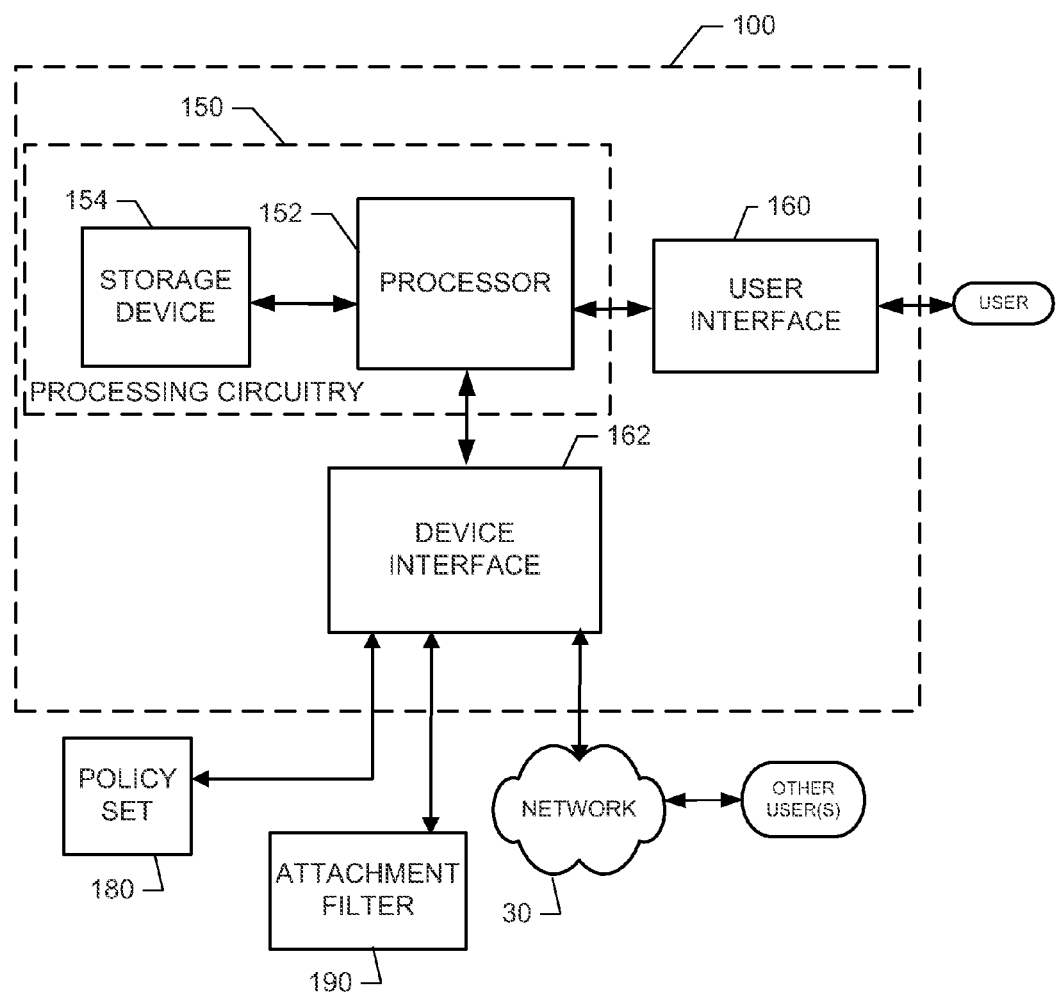
Figure 4:
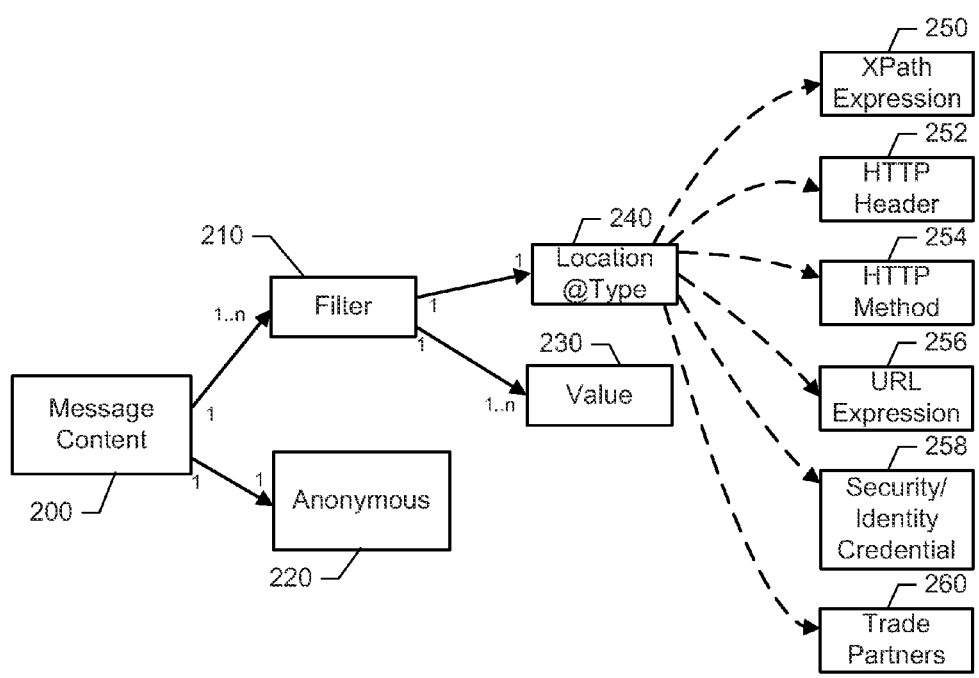
Figure 5:
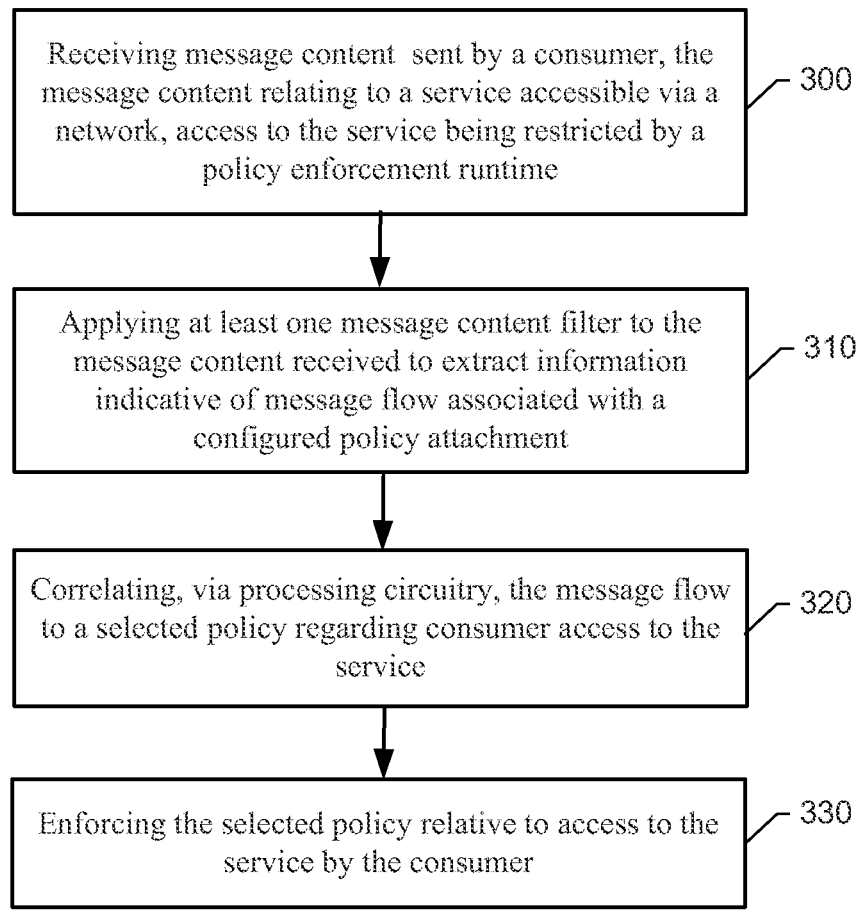

Having thus described the invention in general terms, reference will now be made to the accompanying drawings, which are not necessarily drawn to scale, and wherein:

FIG. 1 illustrates a functional block diagram of a system for provision of associating web service policies based on the application of message content filters according to an example embodiment;

FIG. 2 illustrates a policy enforcement topology according to an example embodiment;

FIG. 3 is a functional block diagram illustrating an apparatus for provision of associating web service policies based on application of message content filters according to an example embodiment;

FIG. 4 is a conceptual block diagram illustrating a message content filter data model that may be employed in connection with the attachment filter of an example embodiment; and FIG. 5 illustrates a block diagram showing operations associated with a method for associating web service policies based on message content filter application according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

With electronic devices becoming ubiquitous in our daily lives, various applications and software have been developed, and continue to be developed, in order to give the users of such devices robust capabilities to access services that enable the users to perform tasks, communicate, entertain themselves, etc. In a typical situation, a service provider is enabled to specify business policy sets based on the service provider resources being used. Thereafter, the policy sets are indiscriminately applied to all consumers of the provider service. As such, many attachment models are focused on service attachment subjects that limit the applicability of policy sets to service attachment points. Accordingly, customers that desire the ability to apply different policies based on the consumer accessing the service are unable to do it. For example, consumers desiring to apply different levels of service for some domain levels (e.g., organization levels, lines of business, departments, consumer applications, etc.) may not be able to achieve their goal. Moreover, customers desiring a level of consistency across attachment choices so that authoring and management of policy domain subjects can be governed in a standardized manner across the enterprise service model, are unable to do so.

Some example embodiments may provide a mechanism to different policies to be applied to different consumers accessing the same service based on information associated with the request received from each respective consumer. Thus, for example, some consumers may access the same service with different policies governing the access. In an example embodiment, a declarative language may be utilized to describe a common set of attachment filtering apparatuses at the enforcement point in order to enable consumer differentiation as described above. Thus, example embodiments may be practiced in the context of a policy enforcement runtime and a policy enforcement runtime configured to apply policies to consumers on the basis of certain characteristics.

FIG. 1 illustrates an example system in which an embodiment of the present invention may be employed. In this regard, FIG. 1 illustrates a generic example of a system in which various consumers or clients may access a particular service as governed by a policy enforcement runtime of an example embodiment. As shown in FIG. 1, a system 10 according to an example embodiment may include one or more client devices (e.g., clients 20). Notably, although FIG. 1 illustrates three clients 20, it should be appreciated that many more clients 20 may be included in some embodiments and thus, the three clients 20 of FIG. 1 are simply used to illustrate a multiplicity of clients 20 and the number of clients 20 is in no way limiting to other example embodiments. In this regard, example embodiments are scalable to inclusion of any number of clients 20 being tied into the system 10. Moreover, it should be appreciated that FIG. 1 illustrates one example embodiment in which shared resources may be allocated within a community of networked devices (e.g., clients 20). However, it should be appreciated that the architecture of various example embodiments may vary. Thus, the example of FIG. 1 is merely provided for ease of explanation of one example embodiment and should not be considered to be limiting with respect to the architecture of the system 10.

The clients 20 may, in some cases, each be computing devices associated with different individuals, locations or entities within an organization. For example, among the clients 20, one client may be associated with a first facility or location of a first organization. Meanwhile, a second client may be associated with a second facility or location of the first organization. As such, for example, some of the clients 20 may be associated with the first organization, while other ones of the clients 20 are associated with a second organization. Thus, for example, the clients 20 may be remotely located from each other, collocated, or combinations thereof. However, in some embodiments, each of the clients 20 may be associated with individuals, locations or entities associated with different organizations or merely representing individual consumers.

Each one of the clients 20 may include or otherwise be embodied as a computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications and a corresponding processor or processing circuitry. Each one of the clients 20 may also include software and/or corresponding hardware for enabling the performance of the respective functions of the clients as described below. In an example embodiment, one or more of the clients 20 may include a client application 22 including software for enabling a respective one of the clients 20 to communicate with the network 30 for requesting and/or receiving information and/or services via the network 30. The information or services receivable at the client applications 22 may include deliverable components (e.g., downloadable software to configure the clients 20, or information for consumption or utilization at the clients 20).

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wired or wireless communication mechanisms and corresponding communication protocols. As such, for example, the network 30 may form a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of a service. The cloud model may include at least five characteristics, at least three service models and at least four deployment models.

Some of the characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In an example embodiment, devices to which the clients 20 may be coupled via the network 30 may include a server network 40 including one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions.

In an example embodiment, one function that may be provided by the application server 40 may be the provision of a service. For example, the application server 40 may respond to consumer requests and/or assign one or more resources to respond to or to be leveraged for responding to the requests. Moreover, in some embodiments the application server 40 may be configured to provide clients 20 with access to tools for receiving various services by executing the tools from the cloud, or by enabling the clients 20 to download the tools from the cloud and execute the tools locally. Thus, in some cases, the client application 22 may be an instance of a tool provided by a resource assigned by the application server 40. However, as indicated above, the tools may instead be instantiated at the application server 40 and/or in the database server 42 for cloud-based execution of some example embodiments. In an example embodiment, the tools and/or services accessed by the client 20 may be provided based on policies that can be determined dynamically based on information associated with the request provided by the client 20, where the information enables a policy enforcement runtime 44 to determine a policy or set of policies to apply to the request. The policy may be enabled to be assigned based on relatively specific and/or granular criteria regarding the objects (e.g., consumers, organizations, service resources, etc.) and content with which the policy is to be associated.

In some embodiments, for example, the policy enforcement runtime 44 may include or have access to stored instructions for handling activities associated with practicing example embodiments as described herein. As such, in some embodiments, the policy enforcement runtime 44 may include software and/or hardware for enabling the application server 40 to communicate with the network 30 and/or the clients 20 for the provision and/or receipt of information associated with performing activities as described herein. In some embodiments, the policy enforcement runtime 44 may be embodied as a DataPower, Message Broker, WESB, CastIron, or other similar product.

The system 10 of FIG. 1 may support a policy enforcement topology where flexibility is provided relative to the service policy governing access to a particular service. FIG. 2 illustrates a policy enforcement topology according to an example embodiment. As shown in FIG. 2, at least a first consumer 50 and a second consumer 52 may desire access to a service 60. The policy enforcement runtime 44 may generate policies that govern the provision of access to the service 60 by the first consumer 50 and the second consumer 52. In a typical environment, a single service policy (e.g., service support for 500 requests per hour) may be provided to both the first and second consumer 50 and 52 (e.g., in accordance with the service level agreement (SLA)). However, according to an example embodiment, the policy enforcement runtime 44 may be configured to provide different policies to different consumers. Accordingly, for example, the first consumer 50 may have a "gold" SLA that enables the first consumer 50 to be allowed 500 requests per hour based on a "gold" consumer policy. Meanwhile, a different policy (e.g., a default policy) may be enforced for the second consumer 52. Thus, for example, the second consumer 52 may have a default SLA entitling the second consumer 52 to 100 requests per hour. The policy enforcement runtime 44 may be configured to utilize a declarative language for describing the application of content filters or a content filtering mechanism at an enforcement point where access to the service 60 is controlled. The declarative language may enable the provision of a policy deployment process to create a transformation capability to define attachment filter semantics in a platform-independent way. However, application of the attachment filter semantics still enable platform-specific configurations to be supported through the use of runtime-specific bindings.

Referring now to FIG. 3, an apparatus 100 for provision of associating web service policies based on application of message content filters is provided. The apparatus 100 may be an entity located in the cloud or at any other location from which the apparatus 100 may impact the provision of access to services based on policies generated in accordance with an example embodiment. The apparatus 100 may be an embodiment of the policy enforcement runtime 44 or a device hosting the policy enforcement runtime 44 such as a policy enforcement point. In some embodiments, the apparatus 100 may be a personal computer system, server computer system, thin client, thick client, handheld or laptop device, multiprocessor system, microprocessor-based system, set top box, programmable consumer electronic device, network PC, minicomputer system, mainframe computer system, distributed cloud computing environment that includes and of the above systems or devices, and/or the like (e.g., one of the clients 20, or a server of the server network 32). The apparatus 100 may function, according to its configuration, as any of a number of different entities. As such, configuration of the apparatus 100 as described herein may transform the apparatus 100 into the policy enforcement runtime 44. In some cases, configuration of the apparatus 100 may be accomplished via executable instructions such as program modules executed by a computer system. The program modules may include routines, programs, objects, components, logic, data structures, and so on that perform particular tasks or implement particular abstract data types.

In an example embodiment, the apparatus 100 may include or otherwise be in communication with processing circuitry 150 that is configured to perform data processing, application execution and other processing and management services according to an example embodiment of the present invention. In one embodiment, the processing circuitry 150 may include a storage device 154 and a processor 152 (which may itself include one or more processors) that may be in communication with or otherwise control a user interface 160 and a device interface 162. As such, the processing circuitry 150 may be embodied as a circuit chip (e.g., an integrated circuit chip) configured (e.g., with hardware, software or a combination of hardware and software) to perform operations described herein. However, in some embodiments, the processing circuitry 150 may be embodied as a portion of a server, computer, laptop, workstation or even one of various mobile computing devices. In situations where the processing circuitry 150 is embodied as a server or at a remotely located computing device, the user interface 160 may be disposed at another device (e.g., at a computer terminal or network access terminal) that may be in communication with the processing circuitry 150 via the device interface 162 and/or a network (e.g., network 30).

Internal communication among components of the apparatus 100 may be accomplished via a communication bus. Such a communication bus may represent one or more of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The user interface 160 may be in communication with the processing circuitry 150 to receive an indication of a user input at the user interface 160 and/or to provide an audible, visual, mechanical or other output to the user. As such, the user interface 160 may include, for example, a keyboard, a mouse, a joystick, a display, a touch screen, a microphone, a pointing device, a speaker, or other input/output mechanisms. In embodiments where the apparatus is embodied at a server or other network entity, the user interface 160 may be limited or even eliminated in some cases. Alternatively, as indicated above, the user interface 160 may be remotely located.

The device interface 162 may include one or more interface mechanisms for enabling communication with other devices and/or networks. In some cases, the device interface 162 may be any means such as a device or circuitry embodied in either hardware, software, or a combination of hardware and software that is configured to receive and/or transmit data from/to a network and/or any other device or module in communication with the processing circuitry 150. In this regard, the device interface 162 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 162 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 154 may include one or more non-transitory storage or memory devices such as, for example, volatile and/or non-volatile memory that may be either fixed or removable. As such, the storage device 154 may include random access memory (RAM) and/or cache memory. In some embodiments, the storage device 154 may be a magnetic disk drive or an optical disk drive (e.g., CD ROM, DVD ROM and/or the like). The storage device 154 may be configured to store information, data, applications, program modules, instructions or the like for enabling the apparatus to carry out various functions in accordance with example embodiments of the present invention. For example, the storage device 154 could be configured to buffer input data for processing by the processor 152. Additionally or alternatively, the storage device 154 could be configured to store instructions for execution by the processor 152. As yet another alternative, the storage device 154 may include one of a plurality of databases that may store a variety of files, contents or data sets. Among the contents of the storage device 154, applications may be stored for execution by the processor 152 in order to carry out the functionality associated with each respective application.

The processor 152 may be embodied in a number of different ways. For example, the processor 152 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 152 may be configured to execute instructions stored in the storage device 154 or otherwise accessible to the processor 152. As such, whether configured by hardware or software methods, or by a combination thereof, the processor 152 may represent an entity (e.g., physically embodied in circuitry) capable of performing operations according to embodiments of the present invention while configured accordingly. Thus, for example, when the processor 152 is embodied as an ASIC, FPGA or the like, the processor 152 may be specifically configured hardware for conducting the operations described herein. Alternatively, as another example, when the processor 152 is embodied as an executor of software instructions, the instructions may specifically configure the processor 152 to perform the operations described herein.

In an example embodiment, the processor 152 (or the processing circuitry 150) may be embodied as, include or otherwise control the policy enforcement runtime 44, which may be any means such as a device or circuitry operating in accordance with software or otherwise embodied in hardware or a combination of hardware and software (e.g., processor 152 operating under software control, the processor 152 embodied as an ASIC or FPGA specifically configured to perform the operations described herein, or a combination thereof)

thereby configuring the device or circuitry to perform the corresponding functions of the policy enforcement runtime 44, as described herein.

In some embodiments, the apparatus 100 may operate based on a set of functional abstraction layers including, for example, a hardware and software layer, a virtualization layer, a management layer and/or a workload layer. In an example embodiment, the hardware and software layer may be provided via a plurality of hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The virtualization layer may provide an abstraction layer from which the following examples of virtual entities may be provided: virtual servers; virtual storage; virtual networks, including virtual private networks; virtual applications and operating systems; and virtual clients. In one example, the management layer may provide any of a number of functions including, for example, resource provisioning metering and pricing, billing or invoicing, security user portal provides access, service level management, Service Level Agreement (SLA) planning and fulfillment, and/or the like. The workloads layer may provide examples of functionality for which the cloud computing environment may be utilized. Examples of workloads and functions which may be provided from this layer include provision of a tool for discovery and realization of business measurement concepts using industry models.

In an example embodiment, the apparatus 100 may perform actions associated with the policy enforcement runtime 44. Thus, for example, the apparatus 100 may be configured to differentiate between consumers based on information or content associated with a request from a consumer, and apply a selected policy based on the information. In some embodiments, the apparatus 100 may include or otherwise have access to a policy set 180 and an attachment filter 190. The policy set 180 may include a plurality of different policies relating to access limitations or criteria to be associated with the granting of access to a service. The attachment filter 190 may include one or more message content filters employing declarative language to describe criteria for filtering message content based on characteristics associated therewith. By employing the attachment filter 190 (e.g., via content filtering), the apparatus 100 may be configured to selectively employ policies from the policy set 180 on the basis of customer differentiation enabled by the filtering of requests received. The attachment filter 190 may be configured to define declarative instructions as to how to extract information from a request in order to classify characteristics of an object (e.g., a specific consumer, organization, resource and/or the like) associated with the request.

FIG. 4 is a conceptual block diagram illustrating a message content filter data model that may be employed in connection with the attachment filter 190 of an example embodiment. The model may be defined by declarative message content filtering language that is configured to declare a collection of filters that, when applied together using declared semantics, may provide a clear representation of the policy subject being associated with a specific policy set. As shown in FIG. 4, a message content element 200 may be defined and include one or more filter elements 210. The message content element 200 may be a root element that contains all filters to be applied as part of a referenced policy scope. The message content element 200 may describe the consumers to which the policy applies. For example, the message content element 200 may employ one or more Filter elements 210 or a Anonymous element 220. If more than one Filter element 210 is specified, the Filter elements must all be adhered to in order for the policy to apply. If a Anonymous element 220 is specified, no other policies must be associated with the subject for the policy to apply. If no Filter element 210 or Anonymous element 220 is specified, the policy may apply to all messages independently of the consumer. When present, the optional attribute/MessageContent@Name may provide the name of the policy.

A filter element 210 may be an optional element (which may repeat) to define a filter condition refining the consumers to which the policy applies. Each filter may define a Location and Value pair. The filter element 210 applies when the value found in the message at the Location matches the Value. When Location points to several locations in a message, the filter element 210 applies if any of the values found at these locations match the Value. When present, an optional attribute (e.g., /MessageContent/Filter@Name) specifies the name of the filter element 210.

Value 230 may be a required element to define the value to be found at the Location for the corresponding filter element 210 to apply. Location 240 may also be a required element to define the Location of the value in the message that is to be tested for the corresponding filter. MessageContent/Filter/Location@Type may define an optional attribute defining the syntax of the Location element. Some examples of queues that may be employed for determining message location and/or type may include identifying and/or determining whether the message supports an XPath (Extensible Markup Language (XML) Path) expression 250, HTTP (Hypertext Transfer Protocol) header information 252, HTTP method 254, URL (Uniform Resource Locator) expressions 256, security identify/credential information 258 and/or trade partner information 260 (e.g., for trading B2B messages).

When present, the non-repeating and optional Anonymous element 220 may specify a policy that applies to anonymous consumers. Thus, the Anonymous element 220 may provide a global type policy for each consumer of the anonymous type. An attachment document that uses this subject is semantically different from an attachment document with no MessageContent element at all. As the latter is interpreted as polices that must be enforced to all consumers—regardless whether they have associated SLAs or not. Policies attached using the Anonymous element 220 may be applied to messages that have no other associated SLA policies using an explicit Message Content Filter policy subject. The Anonymous element 220 may effectively provide a way of defining a default policy that applies only to consumers for which no other SLA policy applies.

An example of a normative schema of a message content filter (e.g., attachment filter 190) is provided below by way of example and not of limitation.

```
< MessageContent Name="xs:string"?>
  (<Filter Name="xs:string">
     < Value>
        xs:string
     </ Value>*
```

```
        < Location Type="xs:anyURI"?>
           xs:string
        < /Location>
      < /Filter> *
      <Anonymous/>?)
  </MessageContent>
```

Thus, example embodiments may enable a policy author and deployer to define filter semantics that enable the attachment filter 190 to indicate a collection of message content based filters (e.g., "All filters must match" collection (AND), "Any filter must match" collection (OR), or "None filter must match" collection (NOT). Example embodiments may also enable the policy author to specify filter semantics to enumerate values that match against the filter elements for single values, sets of values or patterns of values.

Example embodiments may therefore provide a flexible and extensible filtering method and apparatus to solve the challenge of associating policy sets to resources. Example embodiments may also facilitate a consistent and effective use of authoring tools and modeling registries to share and communicate metadata used to associate policy sets to resources or any object that resolves to a resource. Some embodiments may provide operators with an ability to apply policy to multiple applications in a central location and in a manner that enables a policy change to apply to all relevant resources. Accordingly, the complexity of policy governance may be reduced relative to changing policy metadata, changing policy intent, changing policy vocabulary, adding/changing/deleting of policy sets, changing relationships between resources, and/or updating policy subject identities. Some embodiments may enable enforcement of all applicable policy sets before a request reaches provider services and may facilitate migration between connectivity and integration platforms. Example embodiments may integrate with other tools that manage and govern policies and resources.

In an example embodiment, the policy enforcement runtime 44 may be employed in the context of the WS-Policy Attachment standard. In this regard, for example, the WS-Policy Attachment standard from the W3C (World Wide Web Consortium) may define a way to associate a policy, as defined in WS-Policy, with a web service entity, and thus define the constraints and requirements under which consumers are to interact with a service. As an example, a policy may be associated with a service for reliable messaging or for securing messages.

With WS-Policy Attachment alone, policies are typically indiscriminately applied to all consumers (as described above). Thus, cases where it is desirable for the policy to vary dependent upon consumer content involved, WS-Policy Attachment and SLAs cannot achieve the desired outcome. However, by employing the policy enforcement runtime 44 of an example embodiment, WS-Policy Attachment may be extended by defining a way to associate different policies to different consumers by using message content filters to enable a policy subject to represent a consumer-provider pair. The policy enforcement runtime 44 may therefore define message content filter syntax and semantics for scoping policies to specific consumers. In connection with a WS-Policy Attachment standard, the provider may define a domain-specific policy subject to which the policy may apply. Message content filters may then be used to determine the consumer-context filter to which the policy applies. The policy declaration(s) and/or reference(s) may then be defined.

In some embodiments, differentiation between consumers may be achieved by providing a way to limit the application of a given policy to consumers from which the messages they send have specific characteristics. The characteristics may be defined in the form of the filters that define the conditions to be met for a given policy to be applied. The condition may include a specific value to be found at a specific location in the message. The location can be specified in different ways including XPath expressions, HTTP headers, HTTP method/verbs used and/or a regular expression. An example is provided below to show SOAP messages to be filtered based on a specific SOAP header having a specific value.

```
(01)  <wsp: PolicyAttachment xmlns:wsp="...." xmlns:wsmcf="...">
(02)    <wsp: AppliesTo>
(03)      <wsp: URI>
(04)        http://www.example.org/AccountProvider.wsdlll#service
            (AccountManagement)
(05)      <wsp: URI>
(06)      <wsmcf: MessageContent Name=AcmeBank WebApp 'Gold'
          Filter">
(07)        <wsmcf: Filter Name="ConsumerId">
(08)          < wsmcf: Value>AcmeBankingApp</wsmcf:Value>
(09)          <wsmcf: Location Type=http://www.w3.org/TR/1999/REC-
              xpath-19991116>
(10)            //http://acme.enterprise.com:ContextId
(11)          </wsmcf: Location>
(12)        </wsmcf: Filter>
(13)        <wsmcf: Filter Name="ContextId">
(14)          <wsmcf: Value>GoldTier</wsmcf:Value>
(15)          <wsmcf: Location Type=http://www.w3.org/TR/1999/REC-
              xpath-19991116>
(16)            //http://acme.enterprise.com:ContextId
(17)          </wsmcf: Location>
(18)        </wsmcf: Filter>
(19)      </wsmcf: MessageContent>
(20)    </wsp: AppliesTo>
(21)    <wsp:PolicyReference URI="..."/>
(22)  </wsp:PolicyAttachment>
```

In the example above, lines [3] to [5] identify the service provider to which the policy applies. Lines [6] to [19] qualify the consumer to which the policy applies with two message content filters of an example embodiment. The first filter condition identifies messages with a SOAP header http://acme.enterprise.com:ConsumerId with the value "AcmeBankingApp". The second filter condition identifies messages with a SOAP header http://acme.enterprise.com:ContextId with the value "GoldTier".

Thus, for example, the policy enforcement runtime 44 (e.g., via the processing circuitry 150) may be configured to associate web service policies based on message content filter application. From a technical perspective, the apparatus 100 described above may be configured accordingly to be used to support some or all of the operations described herein in relation to the policy enforcement runtime 44. As such, the platform described in FIG. 3 may be used to facilitate the implementation of several computer program and/or network communication based interactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A method according to one embodiment of the invention will now be described in reference to FIG. 5. The method may include receiving message content sent by a consumer where the message content relates to a service accessible via a network and access to the service is restricted by a policy enforcement runtime at operation 300, applying at least one message content filter to the message content received to extract information indicative of message flow (or an object within a message flow) associated with a configured policy attachment at operation 310, correlating the message flow to a selected policy regarding consumer access to the service based on the configured policy attachment at operation 320, and applying (or enforcing) the selected policy relative to access to the service by the consumer at operation 330.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In this regard, in some embodiments the information indicative of the message flow may include information identifying a classification of the consumer, information identifying an organization associated with the message content, or information indicative of a service resource associated with the message content. In an example embodiment, correlating the message flow to a selected policy may include selecting a default policy to each request from an anonymous consumer, and selecting a different policy that is selected based on a classification of the consumer responsive to the consumer not being anonymous. In some embodiments, correlating the message flow to a selected policy may include selecting a policy based on identification of a specific value to be found at a specific location in the message content via the message content filter. In some embodiments, the specific location is specified via an HTTP header, an HTTP method, an XPath expressions, a URL expression, a regular expression, and/or the like.

In an example embodiment, an apparatus for performing the method of FIG. 5 above may comprise a processor (e.g., the processor 152) configured to perform some or each of the operations (300-330) described above. The processor may, for example, be configured to perform the operations (300-330) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising processing circuitry, the processing circuitry being configured to:
   receive message content sent by a consumer, the message content relating to a service accessible via a network, access to the service being restricted by a policy enforcement runtime;
   apply at least one message content filter to the message content received to extract information indicative of message flow associated with a configured policy attachment;
   filtering the message flow according to a selected policy regarding consumer access to the service based on the configured policy attachment; and
   apply the selected policy relative to access to the service by the consumer,
   wherein the service is accessed by a plurality of consumers and the selected policy is one of a plurality of different policies, each of the different policies being associated with a respective different one of the plurality of consumers such that the different policies are applied to different consumers accessing the service based on information associated with respective requests received from each respective one of the consumers.

2. The apparatus of claim 1, wherein the information indicative of the message flow comprises information identifying a classification of the consumer.

3. The apparatus of claim 1, wherein the information indicative of the message flow comprises information identifying an organization associated with the message content.

4. The apparatus of claim 1, wherein the information indicative of the message flow comprises information indicative of a service resource associated with the message content.

5. The apparatus of claim 1, wherein the processing circuitry is configured to filter the message flow according to a selected policy by selecting a default policy to each request from an anonymous consumer, and selecting a different policy that is selected based on a classification of the consumer responsive to the consumer not being anonymous.

6. The apparatus of claim 1, wherein the processing circuitry is configured to filter the message flow according to a selected policy by selecting a policy based on identification of a specific value to be found at a specific location in the message content via the message content filter.

7. The apparatus of claim 6, wherein the specific location is specified via an HTTP header, an HTTP method, an XPath expressions, a URL expression, URL encoded parameters, JSON expression, security/identity credentials, or trading partner information.

8. A computer program product comprising a non-transitory computer-readable storage medium having computer-executable program code instructions stored therein, the computer-executable program code instructions comprising program code instructions for:
   receiving message content sent by a consumer, the message content relating to a service accessible via a network, access to the service being restricted by a policy enforcement runtime;
   applying at least one message content filter to the message content received to extract information indicative of message flow associated with a configured policy attachment;
   filtering, via processing circuitry, the message flow according to a selected policy regarding consumer access to the service based on the configured policy attachment; and
   applying the selected policy relative to access to the service by the consumer,
   wherein the service is accessed by a plurality of consumers and the selected policy is one of a plurality of different policies, each of the different policies being associated with a respective different one of the plurality of consumers such that the different policies are applied to different consumers accessing the service based on information associated with respective requests received from each respective one of the consumers.

9. The computer program product of claim 8, wherein the information indicative of the message flow comprises information identifying a classification of the consumer.

10. The computer program product of claim 8, wherein the information indicative of the message flow comprises information identifying an organization associated with the message content.

11. The computer program product of claim 8, wherein the information indicative of the message flow comprises information indicative of a service resource associated with the message content.

12. The computer program product of claim 8, wherein program code instructions for filtering the message flow according to a selected policy include instructions for selecting a default policy to each request from an anonymous consumer, and selecting a different policy that is selected based on a classification of the consumer responsive to the consumer not being anonymous.

13. The computer program product of claim 8, wherein program code instructions for filtering the message flow according to a selected policy include instructions for selecting a policy based on identification of a specific value to be found at a specific location in the message content via the message content filter.

14. The computer program product of claim 13, wherein the specific location is specified via an HTTP header, an HTTP method, an XPath expressions, a URL expression, URL encoded parameters, JSON expression, security/identity credentials, or trading partner information.

* * * * *